Jan. 6, 1959  R. W. BURTON ET AL  2,867,129
FLUID POWER STEERING VALVE
Filed Oct. 28, 1953  3 Sheets-Sheet 1

INVENTORS
Robert W. Burton &
BY Robert L. Nance
C. H. Dibble
ATTORNEY

2,867,129

FLUID POWER STEERING VALVE

Robert W. Burton, Farmington, and Robert L. Nance, Detroit, Mich., assignors to General Motors Corporation, Detroit, Mich., a corporation of Delaware Application October 28, 1953, Serial No. 388,884

7 Claims. (Cl. 74—388)

This invention concerns a control valve particularly adapted for use in fluid power steering gears, especially such of these gears as are operated with an incompressible fluid, as a mineral oil of suitable viscosity characteristics, for instance.

Control valves presently being employed in fluid power steering systems are open to objection on various grounds. A principal fault resides in the fact that the movable component of the valve tends to bind in the housing within which it is confined, a condition which tends to result in improper operation of the valve and premature wearing of the bearing surfaces. These undesideratum are especially pronounced in the case of valves comprising an axially moving spool element. A valve of this general category is disclosed, for example, in U. S. Patent 2,213,271. In such case, the valve spool is actuated through longitudinal movement of the steering shaft via thrust bearings fixed thereon, the longitudinal movement of the shaft being induced by reaction to the steering resistance. The valve spool surrounds the steering shaft and is in turn surrounded by the valve housing, the three parts being concentric. With this arrangement, any misalignment of the steering shaft as well as of the housing will necessarily operate to cause angular contact of the spool and housing with possible faulty performance of the valve and scuffing of the parts.

The present invention aims to overcome the problems indicated and to generally improve the operation of such valves. A further object is to facilitate the assembling of the valve, a procedure which has heretofore been unduly subject to human error.

The invention will be specifically described with the aid of the accompanying drawings in which.

Figures 1, 2:
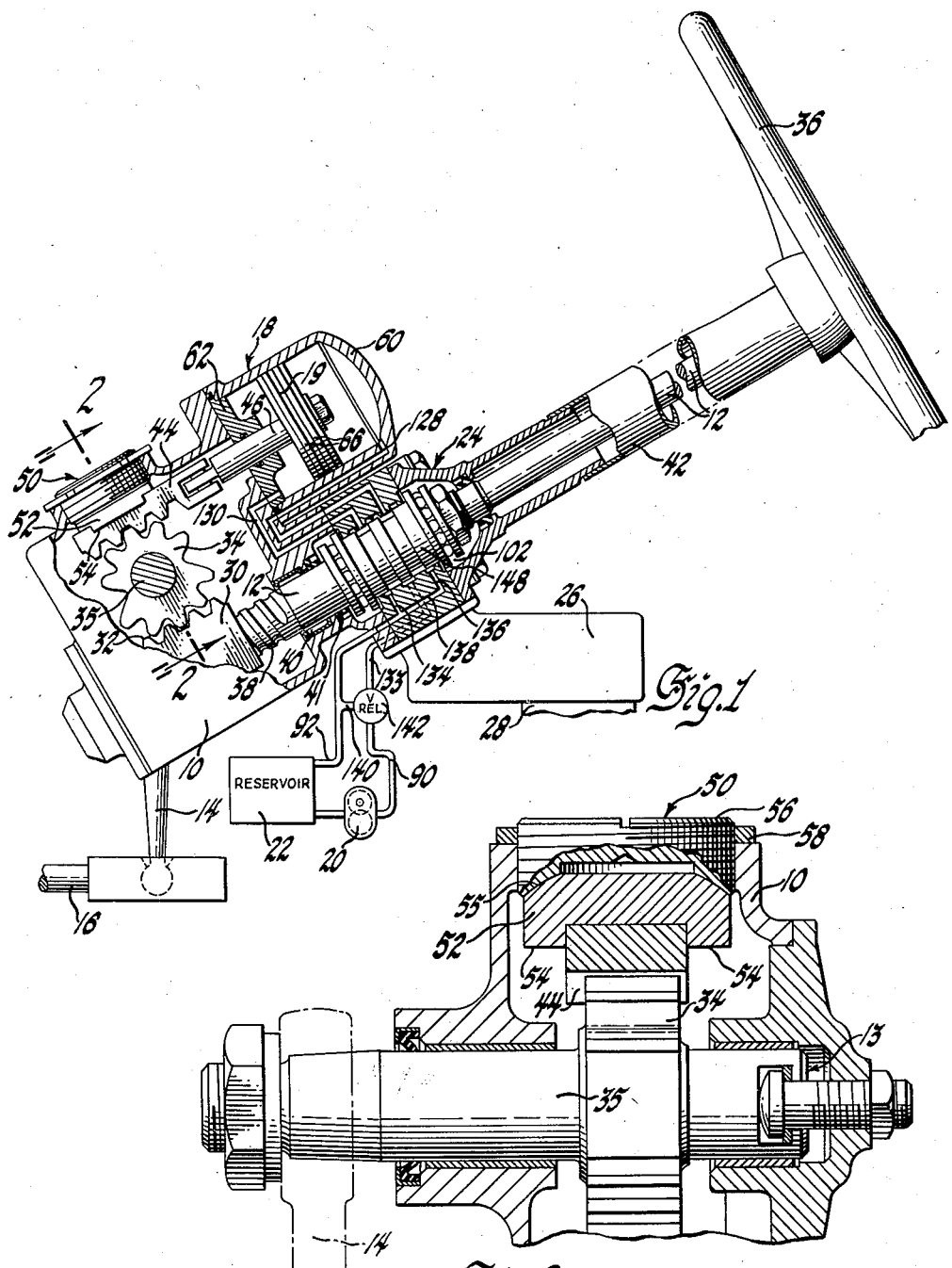
Figure 1 shows a gear of the type to which the invention is especially applicable, certain parts of the gear appearing in section and/or in side elevation, other parts being represented diagrammatically.
Figure 2 is a section on the line 2—2 in Figure 1.

Referring first to Figure 1, it will be observed that the illustrated system includes a gear box or casing 10 confining means for translating the rotary motion of the steering shaft 12 into a rocking motion, manifested through the pitman or drop arm 14, operably connected to the drag link 16; a fluid motor 18 comprising a double acting piston 19; a pump 20, drawing from a reservoir 22; and an "open center" valve 24, controlling the flow of the fluid medium to the motor 18. A bracket mounting 26 secures the principal parts to the frame 28 of the vehicle.

While hydraulic operation of the gear is preferred, as indicated, the same may be adapted for vacuum operation or for operation by means of compressed air, if desired.

The means for attaining the desired rocking movement of the pitman arm 14, shown as having a ball and socket connection with the drag link 16, include a conventional ball nut 30, the rack teeth 32 of which engage with the teeth of one sector of a double sector gear 34 fixed to or integral with the cross shaft 35. The latter has associated therewith a device 13 (Figure 2) of conventional design, enabling lateral adjustment of the gear 34. As well understood by those familiar with this art, the ball nut incident to the steering of the vehicle, is caused to move up or down on the worm 38 integral with the shaft 12; the direction of movement of the nut being determined by the direction of rotation of the steering wheel 36 fixed to the upper end of the shaft.

Figure 3:
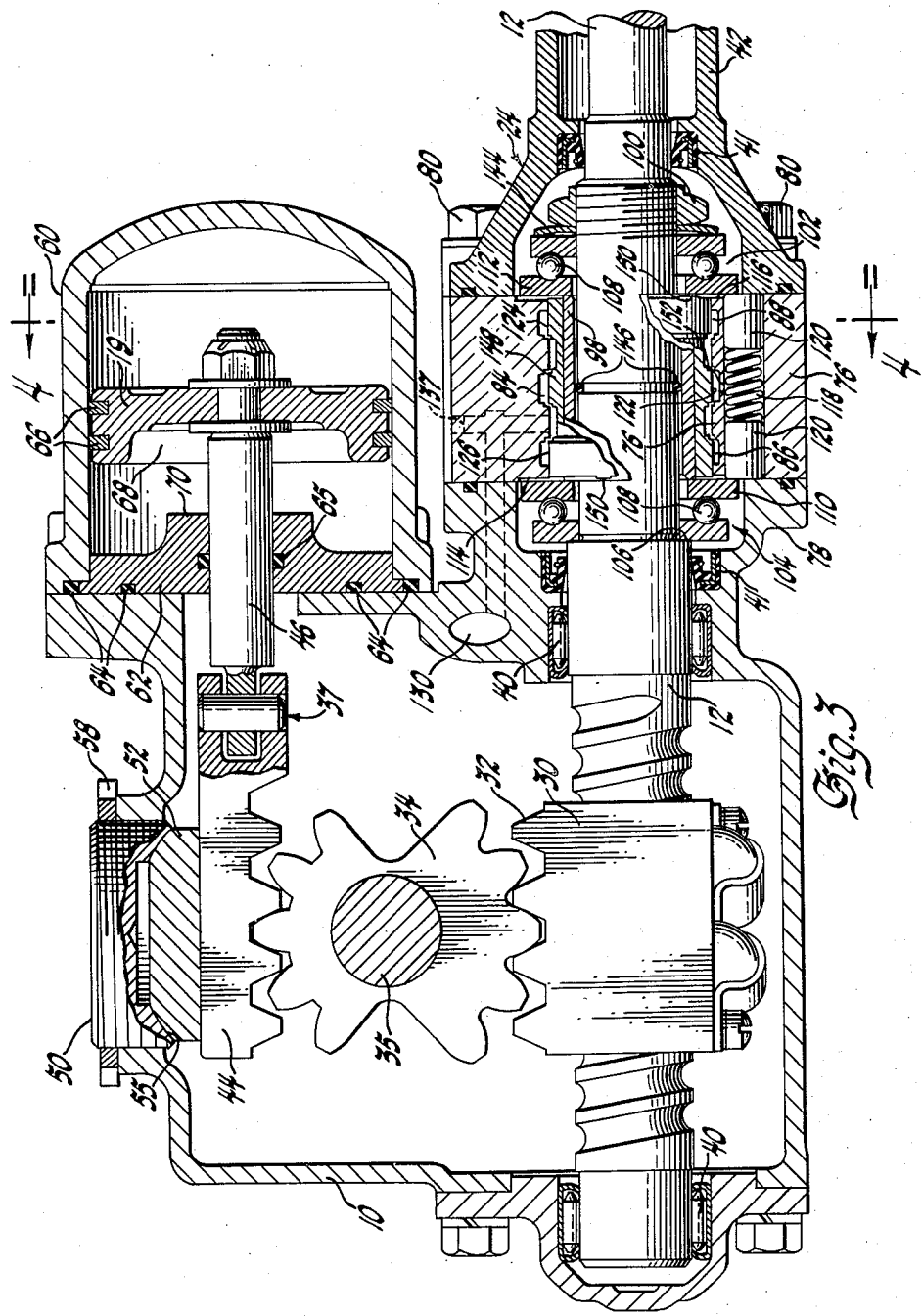
Figure 3 is an enlarged longitudinal section showing the principal parts.

Shaft 12 turns in needle bearings 40 at either end of the worm 38 (Figure 3) and in oil seals 41 at either end of the valve 24. The shaft is housed upwardly of the valve by a mast jacket 42, terminating at the base of the steering wheel, and is supported for limited axial movement.

The upper sector teeth of the double sector gear 34 within the casing 10 will be noted as meshing with the teeth of a rack 44 having a pin and yoke connection 37 with the shaft or stem 46 of the piston 19. An adjustor, generally indicated by the numeral 50, serves to maintain the rack and sector teeth in proper engagement. The adjustor includes a bearing block 52 having portions 54 straddling the back of the rack 44 (Figure 2) so as to guide the same. In order to render the block self-aligning, the upper surface thereof is spherically formed at 55 in a manner complementary to the under surface of a screw member 56 threaded into the casing 10. It should be clear that turning of the screw member downwardly against the bearing block 52 operates to eliminate any undesired lash between the rack and gear sector. Once the proper adjustment has been made, loosening of the screw member is precluded by a locking nut 58.

Figure 5:
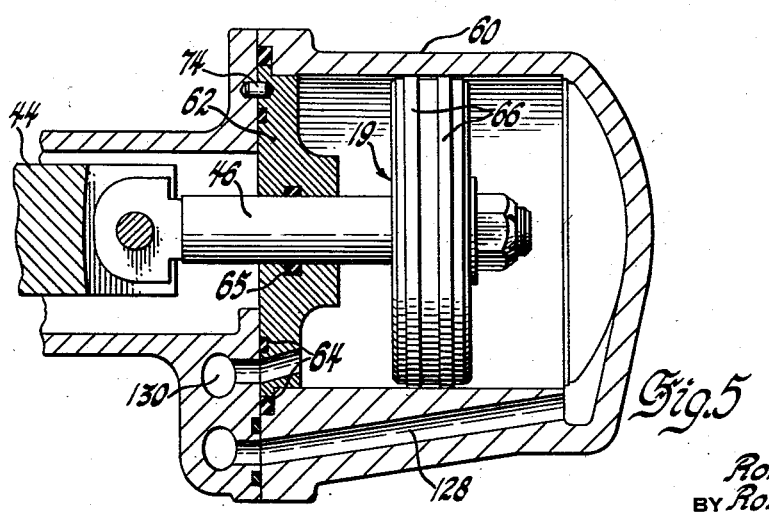
Figure 5 is a section on the line 5—5 in Figure 4.

Cylinder 60, within which the piston 19 is confined, is bolted directly to the gear box 10. A circular adapter plate 62 located by a dowel pin 74 (Figure 5) supplies a bearing for the piston shaft 46 and provides the necessary partition between the cylinder and gear box. Leakage at the flange face between the cylinder and gear box is prevented by annular sealing rings 64. A similar sealing ring 65 surrounds the shaft 46 within the adapter, which is annularly recessed to accommodate the ring.

Piston 19 carries a pair of piston rings 66 and has a recessed face 68 accommodating the boss portion 70 of the adapter on full over leftward movement of the piston.

Control valve 24, which will now be described, is of the spool type and includes a housing 76 held fast to a flange portion 78 of the gear box 10 by bolts 80. These bolts pass through a flanged casing member 82 extending upwardly to join with the lower end of the mast jacket 42.

The valve housing 76 is internally bored and counterbored to form annular oil channels 84, 86 and 88. Channel 84 connects via a passageway 133 with line 90 (Figure 1) from the pump 20, while channels 86 and 88 connect through passageways 134 and 136, respectively, joining within the valve in a common passageway 138, with the line 92 terminating at the reservoir 22. Hose fixtures 94 and 96 seen in Figure 4 correspond to the lines 90 and 92, respectively. These lines should be noted as interconnected through a by-pass line 140 and a relief valve 142, which may be of the spring-loaded ball type, for example. The relief valve operates to relieve the pressure in the pump discharge line whenever such pressure exceeds a predetermined value, calculated to avoid damage to any of the components of the system.

A sleeve element 98 (Figure 3) confined within the housing 76 is made fast to the steering shaft 12, so as to participate in any axial movement thereof, by a nut 100 threaded on the shaft. This nut loads a Belleville type spring 144 which exerts its force against an upper thrust bearing 102 which, through the sleeve 98 forces a lower thrust bearing 104 against an annular shoulder 106 formed incident to the fabrication of the steering shaft. Balls 108 facilitate rotary movement of the steering shaft relative to the sleeve. The limits within which the steering shaft (or the sleeve) can move in an axial direction is set by the depth of the annular recesses 114 and 116 in the housing member 76.

With the inclusion of the Belleville spring, which serves to maintain a constant preload on the affected parts, it is unnecessary as heretofore to depend on human accuracy for the proper setting of these parts. The spring has been found to markedly speed up the assembly operation, it being necessary only to tighten the nut as predetermined extent and to then back off the nut a given number of turns.

A rubber ring 146 surrounding the steering shaft within the sleeve, which is slightly spaced from the shaft, is not a functional part, serving merely in the proper locating and centering of the sleeve during assembly of the valve.

Surrounding the sleeve 98 and concentric therewith is a spool member 148 having a central land 122 and a pair of end lands 124 and 126 of the same diameter as the central land. The central land 122 controls the fluid flow within the valve, annular channel 84 connecting with the inlet porting as previously described, while lands 124 and 126 are functional with respect to passageways 128 and 130, respectively. These latter passageways, as will be seen from Figure 1, interconnect the valve and the fluid motor, passageway 128 terminating at the right hand end of the cylinder 60, passageway 130 at the left hand end thereof. In this figure, to simplify an understanding of the invention, all of the internal passageways comprised in the system are shown diagrammatically and in certain instances out of true position. In the commercial gear, open ends of the drilled lines that do not constitute part of the hydraulic circuit are closed by pressing a steel plug into the opening. One of these plugs is shown at 137 in Figure 3.

Spool 148 carries a tang or projection 150 at either end thereof, these projections being very slightly spaced from the inner ring components 110, 112 of the thrust bearings. Since there is also a slight clearance between the sleeve 98 and the spool, the latter can be said to stand in a "floating" relation with respect to the associated parts. The clearance between the projections 150 and the thrust rings is not such as to adversely affect the proper functioning of the spool.

Figure 4:
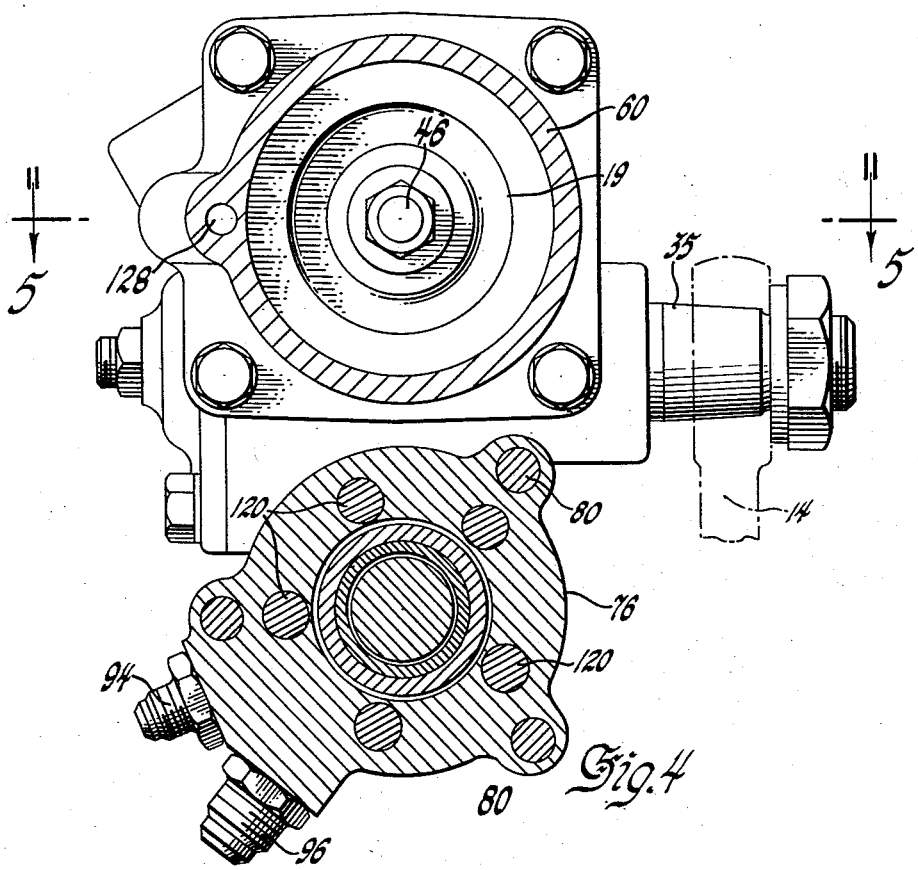
Figure 4 is a section on the line 4—4 in Figure 3.

The valve spool is normally maintained in its centered position within the housing by means including a plurality of springs 118 which operate to resist axial movement of the steering shaft in either direction. These springs are housed between plunger pairs 120, abutting the previously mentioned inner ring components 110 and 112 of the thrust bearings. The springs and plunger pairs are contained in bores in the housing 76, five sets being incorporated in the particular valve (Figure 4). Each of the bores opens to the annular channel 84 through a restricted orifice 152 for a reason which will subsequently appear.

It is important to note that the clearances between the tangs or projections 150 and the adjacent surfaces of the inner thrust members 112 and 114 is very slight, being of the order of .001" in the commercial gear. Thus, any axial movement of the spool 148 relative to the sleeve 98 is never accompanied by any appreciable change in the fluid flow.

With the valve spool in its normal centered position, a condition marked by engagement of the outer end of each plunger 120 both with the adjacent thrust member 112 or 114 and the adjacent shoulder provided by the valve housing (Figure 3), the hydraulic fluid from the pump 20, preferably powered from the engine of the vehicle, is divided into two streams at the central land 122. The stream diverted to the left flows across the annular channel mediate the central land and the end land 126, thence through the passageway 134 to the common return passageway 138. Similarly the stream diverted to the right flows across the annular space between the central land and the end land 124, thence through the passageway 136 to the passageway 138. Lines 128 and 130 being fully open when the valve spool is centered, both ends of the cylinder 60 are normally filled with fluid, maintained under a static pressure by the circulation of the fluid medium as just described.

As previously noted, the annular chamber 84 connecting with the inlet 133 from the pump is, at all times, open to the bores housing the springs 118 through the narrow passageways or orifices 152. Thus, when the spool is moved axially to confine the fluid flow to one side or the other of the valve, the pressure which develops in such side (and in the corresponding chamber of the power cylinder) is applied in aid of the springs against the inner walls of the plungers 120. Accordingly, the resistance which must be overcome by the force tending to move the spool represents (disregarding friction) the sum of the force of the springs and the force of the developed pressure as applied to the plungers. This resistance may amount, for example, to from about two to eight pounds, being determined in any given case by the preloading of the springs 118, and is advantageous as providing a steering "feel" which would otherwise be lacking.

The restricted nature of the passageways 152 provides a metering action giving highly desirable feel characteristics not heretofore approached. Also the valve is rendered more effective as a shock absorber, eliminating most of the road shocks normally transmitted to the steering wheel.

To describe now the general operation of the gear, let it be assumed that the vehicle is in motion and that the steering wheel 36 is rotated clockwise to negotiate a right turn. Clearly any resistance on the part of the cross shaft 35 to turning will be manifested in a reactionary axial thrust on the shaft 12 tending to cause longitudinal movement of the shaft. Now, if the resistance is less than the spring centering force, aided by fluid reaction as just described, no axial movement of the shaft and consequently no axial movement of the valve spool occurs, with the result that the vehicle is steered around the curve or corner solely by manual effort. On the other hand, if the resistance to turning of the shaft 35 is greater than the spring centering force, the steering shaft, and with it the spool 148, is caused to move axially downwardly to bring about partial or complete confinement of the fluid flow (depending upon the exact magnitude of the steering resistance) to the right-hand chamber of the cylinder and partial or complete closing of the passageway 136 which represents the exhaust line from such chamber. Piston 19 and rack 44 are consequently forced to the left to rock the cross shaft 35 in counterclockwise direction, this action being accompanied by exhaustion of fluid from the left chamber of the cylinder through the passageway 134. A steering linkage bringing about turning of the dirigible wheels of the vehicle to the right on rearward movement of the drag link 16 is, of course, assumed.

Should the steering shaft be rotated in a counterclockwise rotation to effect a leftward turning of the dirigible wheels, it should be clear that the action will be just the opposite of that above described.

Having thus described and illustrated our invention, what we claim is:

1. A valve including a stationary part, a movable part having a normal position within said stationary part, one of said parts having a plurality of ports therein, the other a plurality of lands functional with respect to said ports a movable shaft member surrounded by said movable part and thrust means through which movement of said shaft is transmitted to said movable part, the latter in its normal position standing in floating relation with respect to said shaft and being slightly spaced from said thrust means to the end that in operation of the valve binding thereof from misalignment either of said stationary part or said shaft is substantially precluded.

2. A valve including a stationary part, a movable part having a normal position within said stationary part and carrying a pair of protrusions one at either end thereof, one of said parts having a plurality of ports therein, the other a plurality of lands functional with respect to said ports an axially movable shaft member surrounded by said movable part and thrust means whereby movement of said shaft is transmitted to said movable part through said protrusions, said movable part in its normal position standing in floating relation with respect to said shaft with said protrusions slightly spaced from said thrust means to the end that in operation of the valve binding thereof from misalignment either of said stationary part or said shaft is substantially precluded.

3. A valve including a stationary part, a movable part having a normal position within said stationary part, one of said parts having a plurality of ports therein, the other a plurality of lands functional with respect to said ports an axially movable shaft member surrounded by said movable part, a sleeve element between said movable part and said shaft member, said element being slightly spaced both from said movable part and said shaft member, and a pair of thrust bearings fast on said shaft member and contacting the ends of said sleeve, these bearings being slightly spaced from the ends of said movable part so that in operation of the valve binding of said movable part from misalignment either of said stationary part or said shaft member is substantially precluded.

4. A valve including a stationary part, a movable part having a normal position with said stationary part and carrying a pair of protrusions one at either end thereof, one of said parts having a plurality of ports therein, the other a plurality of lands functional with respect to said ports an axially movable shaft member surrounded by said movable part, a sleeve element between said movable part and said shaft member, said element being slightly spaced both from said movable part and said shaft member, and a pair of thrust bearings fast on said shaft member and contacting the ends of said sleeve, these bearings being slightly spaced from said protrusions so that in operation of the valve binding of said movable part from misalignment either of said stationary part or said shaft member is substantially precluded.

5. A valve construction including a stationary housing portion, a movable control portion having a normal position within said housing portion, one of said portions having a plurality of ports therein, the other having a plurality of lands functional with respect to said ports, an axially movable shaft member surrounded by said movable portion, a pair of thrust elements through which movement of said shaft is transmitted to said movable portion, the latter being positioned between said thrust elements in floating relation thereto, and means for maintaining a constant preload on said thrust elements, said means comprising shoulder means associated with the shaft and abutted by said thrust elements and further comprising a Belleville type spring member encircling said shaft and maintained against one of said thrust elements by an adjusting nut threaded on said shaft.

6. A valve construction including a shaft member carrying thereon a sleeve element connected to the shaft by means comprising a pair of annular thrust members positioned on the shaft one at either end of the sleeve, one of said thrust members being held by said sleeve against a shoulder provided by said shaft, the other being held against the opposite end of said sleeve by a Belleville type spring element backed by an adjusting nut threaded on said shaft and operating to maintain a constant preload on said thrust members, said sleeve being surrounded, respectively, by a movable valve part and a stationary part for said movable part, the movable part being disposed between said thrust members in floating relation and being actuated therethrough, one of said parts having a plurality of ports therein, the other a plurality of lands functional with respect to said ports.

7. In a fluid power steering gear including a rotatable steering shaft mounted for limited axial movement, a steering part movable on rotation of said shaft and adapted to transmit forces tending to move said shaft axially and a fluid motor operatively connected to a steering part, the combination of a valve for controlling said motor, said valve comprising a stationary housing and a movable element having a normal position within said housing, one of said stationary housing and said movable element having a plurality of ports therein, the other a plurality of corresponding lands said movable element surrounding said steering shaft and having associated therewith thrust means inducing axial movement thereof with said shaft, said valve being further characterized in that the said movable element, in its normal position, stands in a floating relation with respect to said shaft and is slightly spaced from said thrust means to the end that in operation of the valve binding thereof from misalignment either of said stationary part or said shaft is substantially precluded.

References Cited in the file of this patent

UNITED STATES PATENTS

| | | |
|---|---|---|
| Re. 18,826 | Thomson | May 9, 1953 |
| 208,986 | Patterson | Oct. 15, 1878 |
| 1,022,758 | Seaver | Apr. 9, 1912 |
| 1,640,537 | Dean | Aug. 30, 1927 |
| 2,067,612 | Loeffler | Jan. 12, 1937 |
| 2,213,271 | Davis | Sept. 3, 1940 |
| 2,295,208 | Grove | Sept. 8, 1942 |
| 2,341,018 | Clapp | Feb. 8, 1944 |
| 2,410,404 | Buchanan | Nov. 5, 1946 |
| 2,541,464 | Davies | Feb. 13, 1951 |
| 2,583,295 | Greer | Jan. 22, 1952 |
| 2,605,854 | Mac Duff | Aug. 5, 1952 |
| 2,627,187 | Davis | Feb. 3, 1953 |
| 2,695,766 | Peltz | Nov. 30, 1954 |

FOREIGN PATENTS

| | | |
|---|---|---|
| 417,424 | Great Britain | 1934 |
| 835,970 | Germany | 1952 |